United States Patent [19]
Poon et al.

[11] Patent Number: 5,748,457
[45] Date of Patent: May 5, 1998

[54] FAMILY OF ZERO VOLTAGE SWITCHING DC TO DC CONVERTERS

[76] Inventors: Franki Ngai Kit Poon, Flat 4, 12/F, Yee Mei House, Yee Kok Court, 341 Cheung Sha Wan Road, Kowloon; Man Hay Pong, Flat G, 1st Floor, Tower 13A, South Horizons, Aplei Chau, both of Hong Kong

[21] Appl. No.: 787,295

[22] Filed: Jan. 24, 1997

[51] Int. Cl.[6] .......................... H02M 3/335; H02M 7/537
[52] U.S. Cl. .................................. 363/16; 363/131
[58] Field of Search .......................... 363/16, 17, 97, 363/98, 131, 132

[56] References Cited

U.S. PATENT DOCUMENTS

| | | | |
|---|---|---|---|
| 4,814,962 | 3/1989 | Magalhaes et al. | 363/16 |
| 4,860,184 | 8/1989 | Tabisz et al. | 363/17 |
| 5,057,986 | 10/1991 | Henze | 363/20 |
| 5,402,329 | 3/1995 | Wittenbreder, Jr. | 363/16 |
| 5,539,630 | 7/1996 | Pietkiewicz et al. | 363/17 |
| 5,615,093 | 3/1997 | Nalbant | 363/25 |
| 5,638,260 | 6/1997 | Bees | 363/17 |

*Primary Examiner*—Matthew V. Nguyen

[57] ABSTRACT

A family of power converter is invented. Each of these converter accomplishes zero voltage switching to minimize switching losses. The basic embodiment comprises of two switches connected across the input source, a series combination of inductor and capacitor is connected to the node joining the two switches. The switches are driven by asymmetrical driving pulses with variable duty cycle. The output comprises of an inductor and capacitor filter and diode combinations. This arrangement minimise output ripple. In order to further reduce dissipation switches are connected in parallel with output diodes and these switches operation in synchronization with the main switches. The basic embodiment can be modified to provide converter with negative output or boost output. The embodiment can also be modified for isolated converter with transformer in both the half bridge and full bridge circuit.

14 Claims, 13 Drawing Sheets

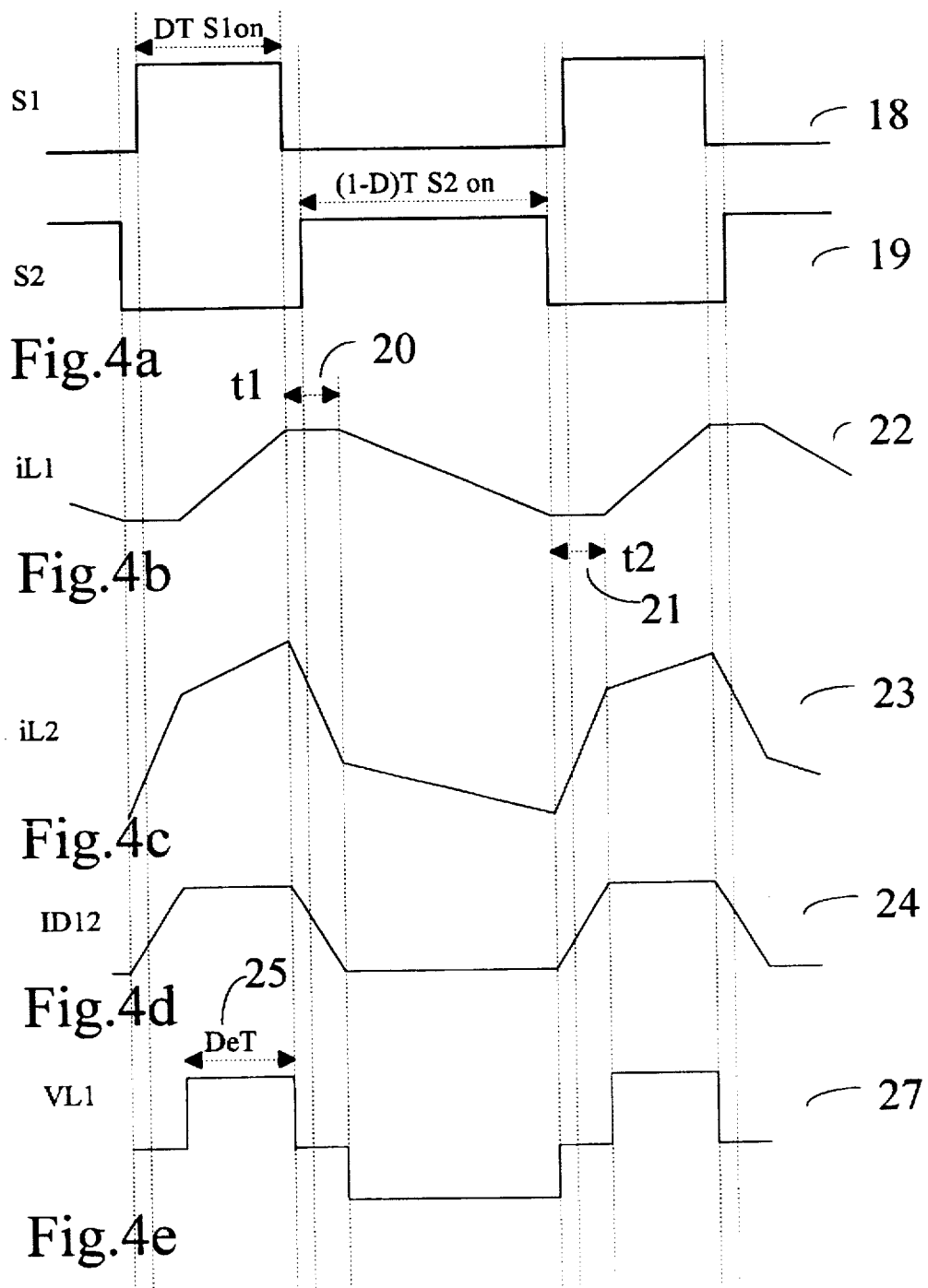

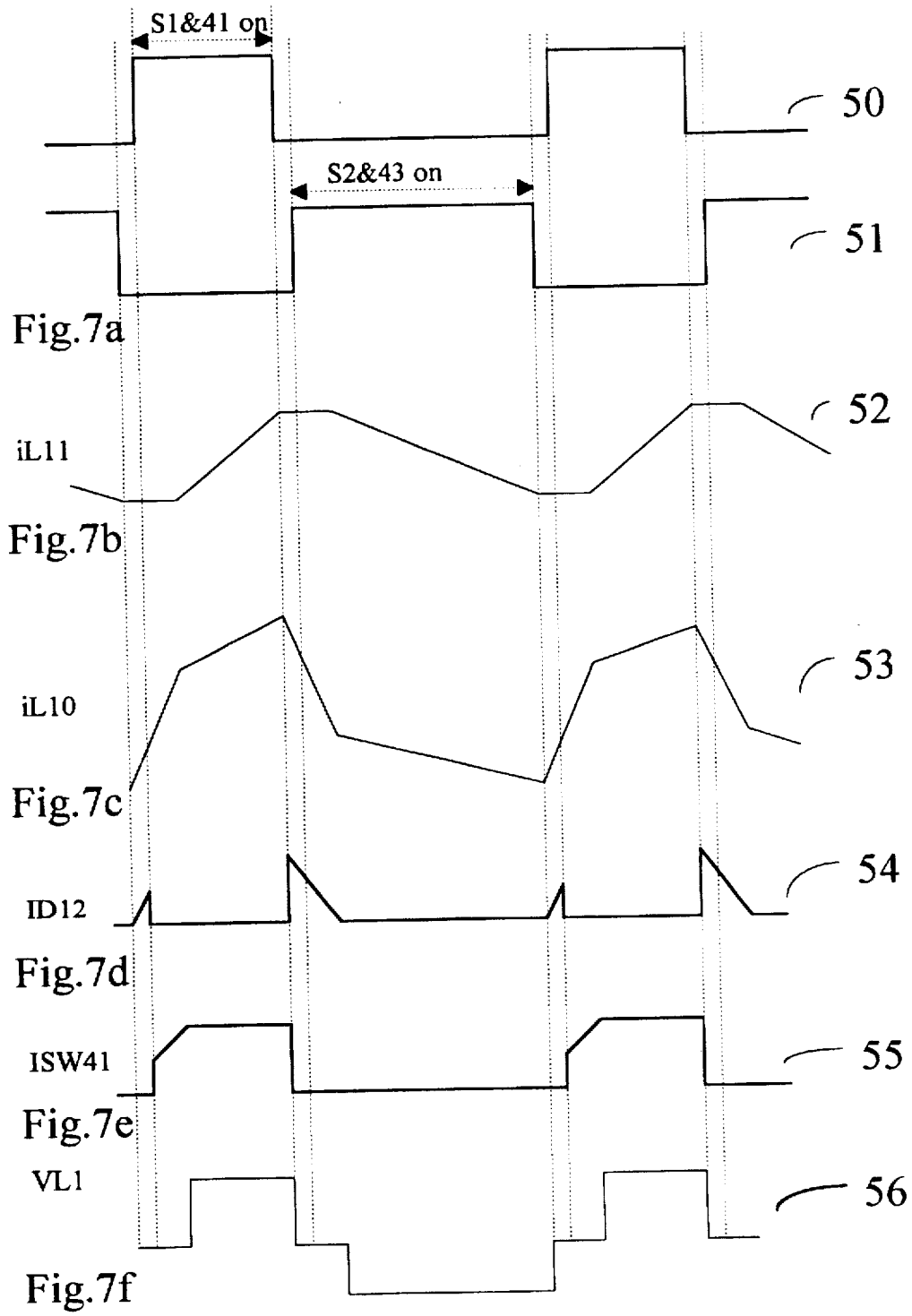

FAMILY OF ZERO VOLTAGE SWITCHING DC TO DC CONVERTERS

BACKGROUND OF THE INVENTION

This invention relates generally to DC-DC power converters with minimized switching losses.

Switching converters are widely used to convert electrical energy from one voltage level to another voltage level. These converters usually operate at high frequencies and the switching losses of the switching devices form a significant portion of the total losses. A lot of work have been done which attempt to reduce the switching losses and Zero Voltage Switching (ZVS) is a promising way to reduce switching losses especially when the semiconductor switches are field effect transistors with considerable device capacitances. A widely discussed circuit type is the resonant converters with sinusoidal voltage or current transitions but these circuits impose excessive voltage or current stresses upon the switches which make these converters impractical to be used widely. There are modifications based upon the resonant converters like the multi-resonant converters but the analysis and control of these converters are too complicated and are again difficult to be applied to commercial products.

FIG. 1 shows a prior art circuit proposed by K. Harada, et al, in a paper entitled "Saturable Inductor Commutation for Zero Voltage Switching in DC-DC Converter", who make use of a saturable inductor in a half bridge circuit. When one of the switches in the half bridge circuit switches off, the current retained in the inductor exchange the charges in the parasitic capacitances in parallel with the two switches and create a zero voltage transition for one of the switches. The switch is then turned on and achieve Zero Voltage Switching (ZVS).

FIG. 2 shows a prior art ZVS circuit invented by C. P. Henze, et al, in U.S. Pat. No. 5,057,986. In this circuit two switches in a half bridge configuration turn on and off alternately which drive a series combination of the primary winding of a transformer and a capacitor. A third switch is used on the secondary side which synchronizes with the upper switch on the primary side. However, this converter provides ZVS only at relatively low load current, as it is pointed out that the magnetizing current must have a peak-to-peak amplitude greater than twice the load current contributions to the primary side. In this case the total primary current is a lot higher than it should be if magnetizing current had not been so high, and this induces unnecessary conduction losses in the switches on the primary side. Furthermore, energy is transferred by a store and discharge manner. The capacitor on the primary side is charged up when the lower switch is turned on and energy is delivered to the secondary side when the upper switch is turned on. This mechanism increases losses in the components which act as the energy buffer. The capacitor connected in parallel with the load takes high pulsating current in the order of the load current. This will cause high voltage ripples at the load and special capacitors with low series resistance must be used and the product cost will be burdened. Also this will increase losses through the output diode.

Wittenbreder, Jr. proposed a similar configuration in U.S. Pat. No. 5,402,329. An inductor is added in series with the capacitor on the primary side and this increases the range in which Zero Voltage Switching can be obtained. However, the output capacitor has to take up high ripple current and this results in high conduction losses through the output diode, plus the disadvantage of high output voltage ripple.

This document describes the invention of a family of DC to DC converters which retain ZVS over a wide load current range and excessively high magnetizing current is not necessary. Also, this family of converters transfer energy directly from the source to the load and comprises an output inductor capacitor filter combination which not only greatly reduces output ripple voltage but also bring in totally different operation mechanisms. The basic circuit comprises of a minimum number of components for simple and high efficiency step down operations. A member circuit provide the means for step up operation and another provides output with a reverse voltage polarity. Transformers can be used to this converter family for isolation purpose.

SUMMARY OF THE INVENTION

A family of power converter is invented which enables high efficiency power conversion. The basic embodiment of the invention is a DC to DC step down power converter. It comprises of two input terminals which can be coupled to a source of DC potential, two output terminals which can be coupled to a DC load. It further comprises first and second switches connected in series across the input terminals. Each switch having a first and a second switch terminals and a control terminal, and a switch diode with its anode connected to the second switch terminal and the cathode connected to the first switch terminal.

This switch diode may be a component external to the switch or an integrated part of the switch. A first capacitor in series with a first inductor is connected to the junction of the first and second switch, the other end of the capacitor inductor combination is then connected to the first terminal of a second inductor. The first terminal of the second inductor is connected to the anode of a third diode and the cathode of this third diode is connected to the cathode of a fourth diode. The anode of the fourth diode is connected to one of the two input terminals which has a lower potential. The second inductor has its second terminal connected to the input terminal which has a lower potential. A third inductor has one of its terminals connected to the cathode of the fourth diode and the other terminal connected to a second capacitor, this terminal is also connected to the output terminal which has the higher potential. The other output terminal is connected to the second capacitor and is also connected to the input terminal with lower potential. The second capacitor and the third inductor make up an inductor-capacitor filter for output voltage ripple reduction.

During operation the first and second switches periodically and alternately open and close. After one switch turns off a small time gap is lapsed before the turning on of the other switch. This small time gap prevents the short circuiting of the input voltage and it also allow time for the voltage of one device to fall to zero before it switches on, thus enabling Zero Voltage Switching.

In order to reduce the dissipation in the third and fourth diode, another embodiment is proposed with a third and a fourth switch connected across the third and the fourth diode respectively. The third switch operates in synchronization with the first switch and the fourth switch operates in synchronization with the second switch. Effectively these switches are turned on to reduce the voltage drop across the third and the fourth diode thus reducing conduction losses and is particularly effective when the output voltage is low.

Furthermore, this converter family comprises of embodiments for generation of output with negative voltage, step up voltage operation and full bridge operations. The family also comprises of embodiments with transformer isolation in the half bridge and half bridge configurations. This converter family provides the means for high efficiency power conversion and the very versatile embodiments provide full coverage of various requirements.

BRIEF DESCRIPTION OF THE DRAWINGS

FIG. 4a–FIG. 4e show the timing diagrams which illustrate the operation of the power converter of FIG. 3.

FIG. 7a–FIG. 7f show the timing diagram which illustrate the operation of the power converter of FIG. 6.

DESCRIPTION OF THE PREFERRED EMBODIMENT

Figure 1:
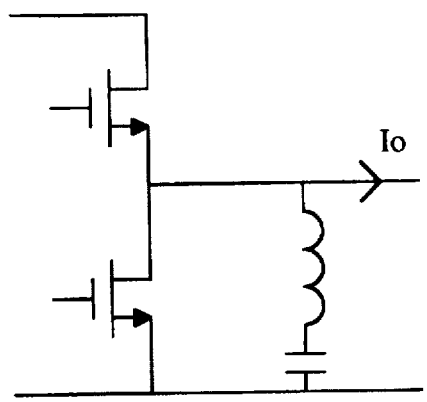
FIG. 1 is a schematic diagram of a prior art zero voltage switching power converter.
Figure 2:
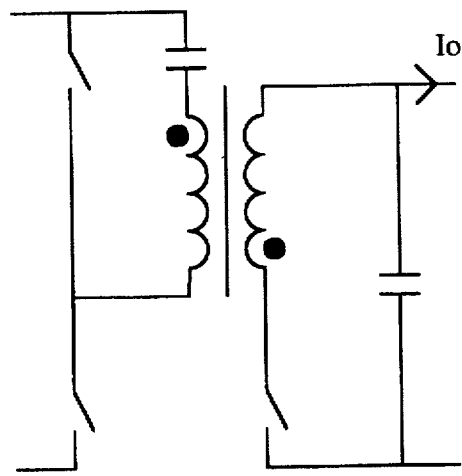
FIG. 2 is a schematic diagram of a prior art zero voltage switching power converter with transformer isolation.
Figure 3:
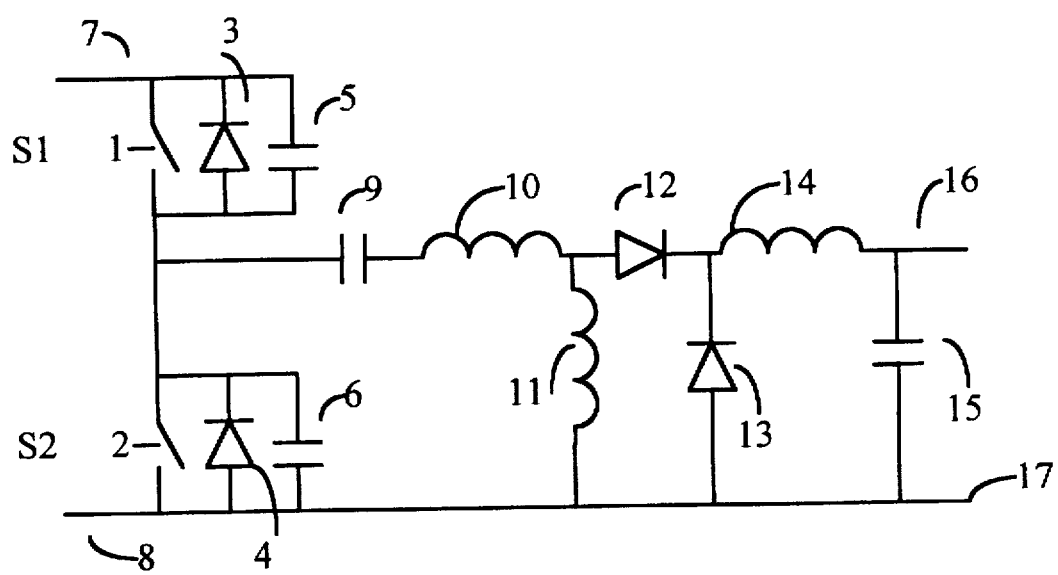
FIG. 3 is the schematic diagram of a basic embodiment of the converter family in accordance with the present invention.

The basic embodiment of the converter family is shown in FIG. 3. Two switches 1 and 2 are connected across the input terminals. Diodes 3 and 4 are connected in antiparallel with these switches. The switches are typically semiconductor devices like the Field Effect Transistor. The capacitors 5 and 6 can be external components or they can simply be the parasitic capacitance of these switches. Similarly diodes 3 and 4 can be external components or they can be the parasitic diodes of, say, Field Effect Transistors. In addition to the switches, the circuit comprises of a DC blocking capacitor 9, inductors 10 and 11, two diodes 12 and 13, and output filter inductor 14 and output filter capacitor 15.

Switches 1 and 2 are driven on and off alternately. The driving waveforms are 18 and 19 as shown in FIG. 4a, when switch 1 is turned on switch 2 is turned off, and vice versa. There is a time gap between the turning off of one switch and the turning on of the other switch so that there is no chance that both switches are turned on simultaneously and cause a short circuit of the input source. This pre-determined time gap also enables Zero Voltage Switching to occur. In general, this time gap is small compared to the period of the switching waveform. The frequency of the switching waveforms may or may not be fixed but the duty cycle, i.e., the ratio of the closure time of switch 1 to the period, can be varied from 0 to 1. The duty cycle regulate the output voltage of the converter.

Figure 5A:
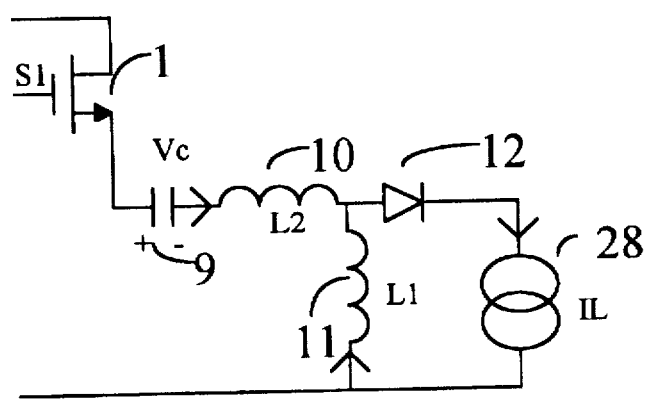
FIG. 5a–FIG. 5d represent the simplified schematic drawings of the switching stages of the converter of FIG. 3.

The circuit operation can be understood by considering the time period when switch 1 is turned on. Current flows through switch 1, capacitor 9, inductor 10, diode 12 and through the output filter to the output load. Current also flows in inductor 11 as the magnetizing current. It is assumed that filter inductor 14 has a value large enough such that the current through which remains non zero within a switching cycle, in other words the converter operates in the continuous conduction mode. Having made this assumption one can represent the filter section and the output load by a constant current sink. The equivalent circuit during this time period is shown in FIG. 5a. In this time period energy is delivered to the output load. The capacitor 9 is chosen to have a value large enough so that its voltage can be considered constant within one switching cycle. In this circuit mode a voltage is developed across inductor 11 and its current rises in an almost linear manner, and therefore current through inductor 10 also rises in the same manner as the output current is constant.

Figure 5B:
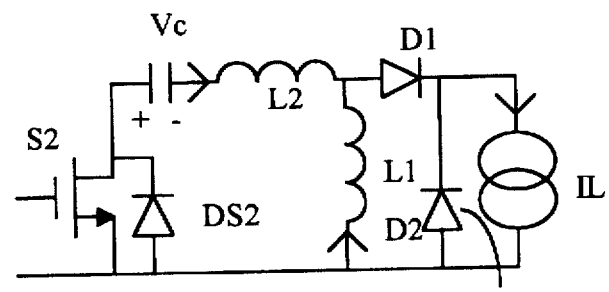

Current through inductor 10 continuous to rise until switch 1 is turned off. The parasitic capacitance 5 keeps the voltage of switch 1 zero when it switches off and thus eliminate switching losses. Energy stored in inductor 10 charges up the parasitic capacitor 5 of switch 1 and discharges the parasitic capacitor 6 of switch 2 until the voltage across switch 2 is zero. Current is then directed through diode 4 and keeps the voltage across switch 2 zero. Switch 2 is then programmed to turn on so that there is no switching losses. The equivalent circuit is shown in FIG. 5b. In this circuit mode current through diode 12 decreases as a reverse voltage is developed across inductor 10. In order to sustain the load current represented by the current sink, diode 13 is turned on and its current increases. At this moment both diode 12 and diode 13 are conducting and the voltages across them are assumed zero. As diode 12 and diode 13 are connected in parallel with inductor 11, the voltage across inductor 11 is zero and so is the rate of change of current. So from FIG. 4b the current of inductor 11 is more or less unchanged within this period.

Figure 5C:
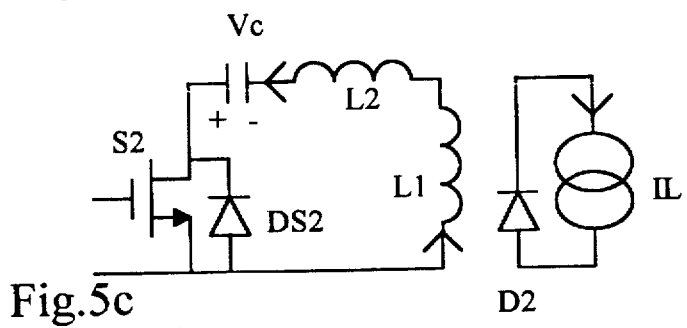

Current through inductor 11 continues to fall until the current through diode 12 falls to zero and diode 12 is completely cut off. The load current IL is conducting through diode 13 only. The equivalent circuit is shown in FIG. 5c. In this circuit mode both inductor 10 and inductor 11 are connected across capacitor 9, and the current through these inductors continues to fall at a rate determined by the capacitor voltage.

Figure 5D:
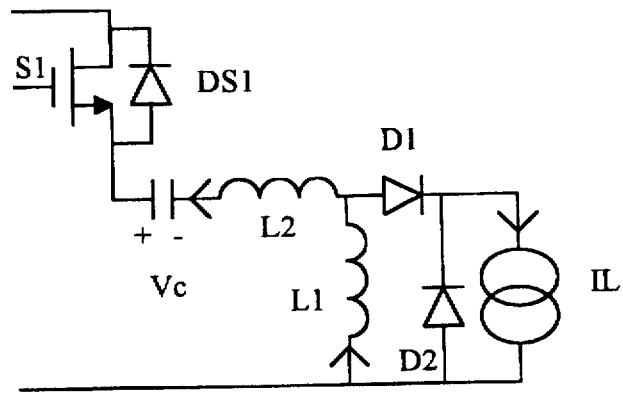

Current through inductors 10 and 11 continues to fall until switch 2 is turned off. The parasitic capacitance 6 keeps the voltage of switch 2 zero when it switches off and thus eliminate switching losses. Energy stored in inductor 10 charges up the parasitic capacitance 6 of switch 2 and discharges parasitic capacitance 5 of switch 1 until the voltage across switch 1 is zero and the anti-parallel diode 3 is turned on. Zero voltage is then developed across switch 1 and it is programmed to turn on and switching losses is eliminated. The equivalent circuit is shown in FIG. 5d. In this circuit mode diode 12 starts to conduct and current through diode 13 start to fall. At this moment both diode 12 and diode 13 are conducting and the voltages across them are assumed zero. As diode 12 and diode 13 are connected in parallel with inductor 11, the voltage across inductor 11 is zero and so is the rate of change of current. So from FIG. 4b the current of inductor 11 is more or less unchanged within this period. This circuit mode ends when current through diode 12 has increased to the load current and diode 13 is completely cut off. The operation then continues by repeating the circuit modes as illustrated in FIG. 5a.

The average voltage across the output load is the average voltage across the hypothetical current sink which represents the filter and the output load.

$$V_{out} = (V_{in} - V_{cap9} - V_{ind10}) \cdot D_e \quad (1)$$

In this equation, $V_{out}$ is the average output voltage. $V_{in}$ is the input source voltage. $V_{cap9}$ is the voltage across capacitor 9, which is assumed constant in the switching cycle. $V_{ind10}$ is the voltage across inductor 10, and very often this term is small compared to other terms and can be neglected. $D_e$ is the effective duty cycle across the hypothetical load where $$De = \frac{1}{T}(D \cdot T - t2) \quad (2)$$

In deriving these equations it is assumed that all switches are ideal, and the time gap between the turning off of switch 1 and turning on of switch 2 is small and negligible, and the same is applied to the time gap between the turning off of switch 2 and turning on of switch 1.

The time period t1 is shown in FIG. 4b, during this time interval both diodes 12 and 13 are conducting and inductor 10 is subjected to the capacitor voltage $V_{cap9}$. An equation can be written which describes the fall in current through diode 12.

$$V_{cap9} = L_{ind10} \cdot \frac{Iload}{t1} \quad (3)$$

Similarly the time period t2 is related to the rise in current through diode 12 as specified in the following equation.

$$V_{in} - V_{cap9} = L_{ind10} \cdot \frac{Iload}{t2} \quad (4)$$

In the steady state, the voltage-time integral across inductor 11 must be equal to zero in a switching cycle.

$$(V_{in} - V_{cap9} - V_{ind10}) \cdot (D \cdot T - t2) = (V_{cap9} - V_{ind10}) \cdot ((1-D) \cdot T - t1) \quad (5)$$

The voltage across inductor 10, $V_{ind10}$ and $V_{ind10'}$ are usually small and can be neglected. Hence the average output voltage can be obtained by solving equations (1) to (5) and is represented by $$V_{out} = V_{in} \cdot D - D^2 \cdot V_{in} + \frac{L_{ind10} \cdot I_{load}}{T} \quad (6)$$

It can also be shown that the voltage across capacitor 9 is directly proportional to duty cycle D $$V_{cap9} = V_{in} \cdot D \quad (7)$$

A converter of the basic embodiment has been built for an input voltage 105V and an output voltage of 23V. Switches 1 and 2 are realized by MOSFETs IRF830, capacitor 9 has capacitances of 0.69 uF, inductor 11 is of type EI28 with inductance 1.5 mH, inductor 10 has an inductance of 4 uH, diodes 12 and 13 are of Schottky diode type 2090, inductor 14 has inductance of 573 uH and capacitor 15 has capacitance of 47 uF. At an output current of 1.4 A, efficiency of 91% is recorded. The switching frequency is 167 kHz.

Figure 6:
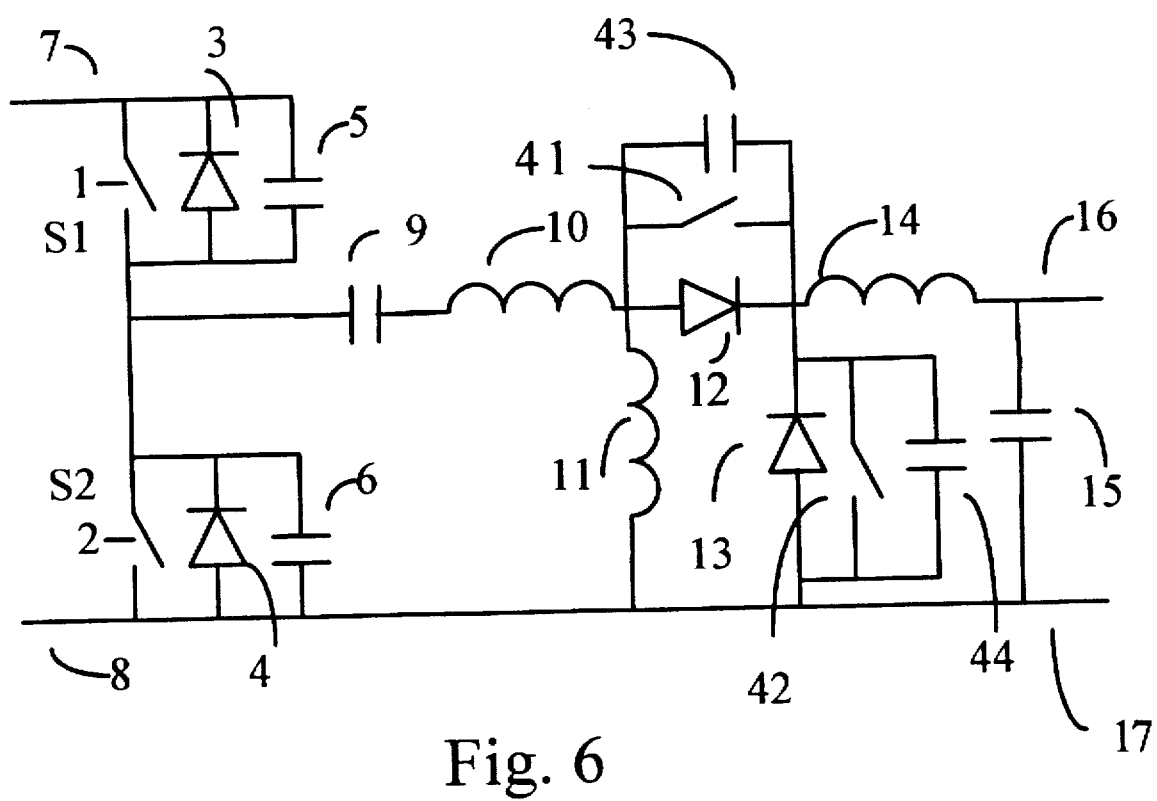
FIG. 6 is the schematic diagram of a modified basic embodiment with synchronized switches.

The basic embodiment so described can be extended with an objective to reduce dissipation in the diodes 12 and 13 and the new embodiment is shown in FIG. 6. A switch 41 and a capacitor 43 are added in parallel with diode 12, capacitor 43 can be a discrete component or the parasitic capacitance of the switch and the diode. Another switch 42 and capacitor 44 are added in parallel with diode 13, capacitor 44 can be a discrete component or the parasitic capacitance of the switch and the diode. Switch 41 is synchronized with switch 1 and is turned on and off at the same time. Switch 42 is synchronized with switch 2.

Switches 1 and 2 are driven on and off alternately. The driving waveforms are 50 and 51 are shown in FIG. 7a. The same driving waveforms are applied to switches 41 and 42 respectively. When switch 1 is turned on switch 2 is turned off, and vice versa. There is a time gap between the turning off of one switch and the turning on of the other switch so that there is no chance that both switches are turned on simultaneously and cause a short circuit of the input source. This pre-determined time gap also enables Zero Voltage Switching to occur. In general, this time gap is small compared to the period of the switching waveform. The frequency of the switching waveforms may or may not be fixed, but the duty cycle, i.e. the ratio of the closure time of switch 1 to the period, can be varied from 0 to 1. The duty cycle regulate the output voltage of the converter.

Figure 8A:
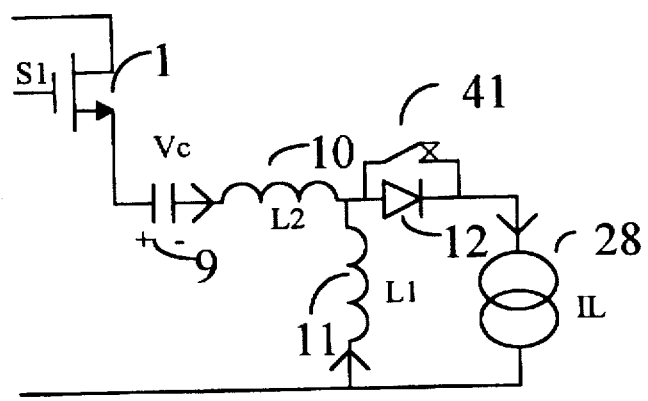
FIG. 8a–FIG. 8d represent the simplified schematic drawings of the switching stages of the converter of FIG. 6.

The circuit operation can be understood by considering the time period when switch 1 and switch 41 are turned on. Current flows through switch 1, capacitor 9, inductor 10, switch 41 and through the output filter to the output load. Current also flows in inductor 11 as the magnetizing current. It is assumed that filter inductor 14 has a value large enough such that the current through which remains non zero within a switching cycle, in other words the converter operates in the continuous conduction mode. Having made this assumption one can represent the filter section and the output load by a constant current sink. The equivalent circuit during this time period is shown in FIG. 8a. In this time period energy is delivered to the output load. The capacitor 9 is chosen to have a value large enough so that its voltage can be considered constant within one switching cycle. In this circuit mode a voltage is developed across inductor 11 and its current rises in an almost linear manner, and therefore current through inductor 10 also rises in the same manner as the output current is constant.

Figure 8B:
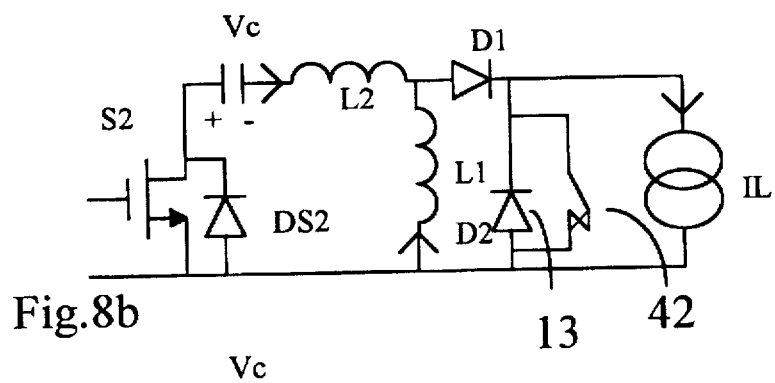

Current through inductor 10 continuous to rise until switch 1 is turned off. The parasitic capacitance 5 keeps the voltage of switch 1 zero when it switches off and thus eliminate switching losses. Energy stored in inductor 10 charges up the parasitic capacitor 5 of switch 1 and discharges the parasitic capacitor 6 of switch 2 until the voltage across switch 2 is zero. Current is then directed through diode 4 and keep the voltage across switch 2 zero. Switch 2 is then programmed to turn on so that there is no switching losses. When switch 1 is turned off, switch 41 is also turned off simultaneously. Current in switch 41 is directed through diode 12. When switch 2 is turned on, switch 42 is turned on simultaneously. Both switches 41 and 42 switch off and on respectively with zero voltage. This is because when switch 41 turns off its voltage is clamped to zero voltage by diode 12, an before switch 42 turns off, diode 13 is already conducting and therefore the voltage across switch 42 is zero. The equivalent circuit is shown in FIG. 8b. In this circuit mode current through diode 12 decreases as a reverse voltage is developed across inductor 10. In order to sustain the load current represented by the current sink, diode 13 and switch 42 are turned on and its current increases. At this moment both diode 12 and the diode 13 switch 42 combination are conducting and the voltages across them are assumed zero. As diode 12 and diode 13 are connected in parallel with inductor 11, the voltage across inductor 11 is zero and so is the rate of change of current. So from FIG. 7b the current of inductor 11 is more or less unchanged within this period.

Figure 8C:
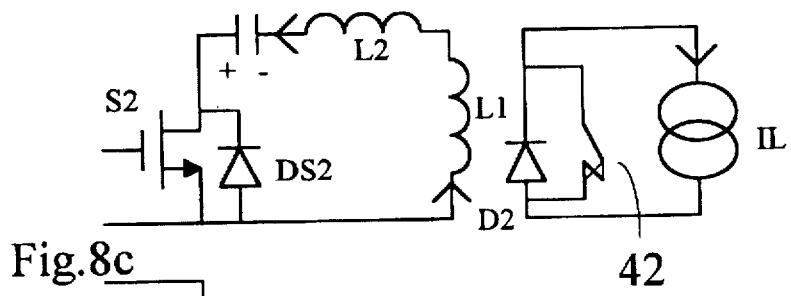

Current through inductor 11 continues to fall until the current through diode 12 falls to zero and diode 12 is completely cut off. The load current IL is conducting through the diode 13 switch 42 combination only. The equivalent circuit is shown in FIG. 8c. In this circuit mode both inductor 10 and inductor 11 are connected across capacitor 9, and the current through these inductors continues to fall at a rate determined by the capacitor voltage.

Figure 8D:
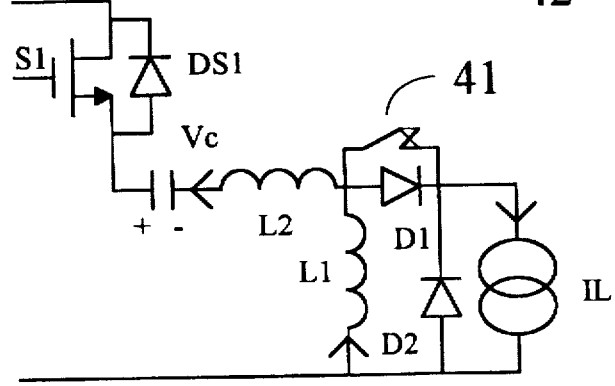

Current through inductors 10 and 11 continues to fall until switch 2 is turned off. The parasitic capacitance 6 keeps the voltage of switch 2 zero when it switches off and thus eliminate switching losses. Energy stored in inductor 10 charges up the parasitic capacitance 6 of switch 2 and discharges parasitic capacitance 5 of switch 1 until the voltage across switch 1 is zero and the anti-parallel diode 3 is turned on. Zero voltage is then developed across switch 1 and it is programmed to turn on and switching losses is eliminated. When switch 2 is turned off, switch 42 is also turned off simultaneously. Current in switch 42 is directed through diode 13. When switch 1 is turned on, switch 41 is turned on simultaneously. Both switches 41 and 42 switch on and off respectively with zero voltage. This is because when switch 42 turns off its voltage is clamped to zero voltage by diode 13, and before switch 41 turns on, diode 12 is already conducting and therefore the voltage across switch 41 is zero. The equivalent circuit is shown in FIG. 8d. In this circuit mode diode 12 starts to conduct and current through diode 13 start to fall. At this moment both the diode 12 switch 41 combination and diode 13 are conducting and the voltages across them are assumed zero. As diode 12 and diode 13 are connected in parallel with inductor 11, the voltage across inductor 11 is zero and so is the rate of change of current. So from FIG. 7b the current of inductor 11 is more or less unchanged within this period. This circuit mode ends when current through the diode 12 switch 41 combination has increased to the load current and diode 13 is completely cut off. The operation then continues by repeating the circuit modes as illustrated in FIG. 8a.

An alternative way to control the turning on and off of switches 41 and 42 is to synchronize with the voltage across inductor 11. When the voltage across inductor 11 goes positive, switch 41 is turned on; when the voltage across inductor 11 goes negative switch 42 is turned on; when the voltage is zero, none of the two switches 41 and 42 are turned on. This method will cause more current to flow through the diodes 12 and 13 but the driving circuits of switches 41 and 42 will be simpler especially in later case where transformer isolation is implemented.

The equations derived in previous sections are still applicable to the embodiment with the addition of switches 41 and 43.

Figure 9:
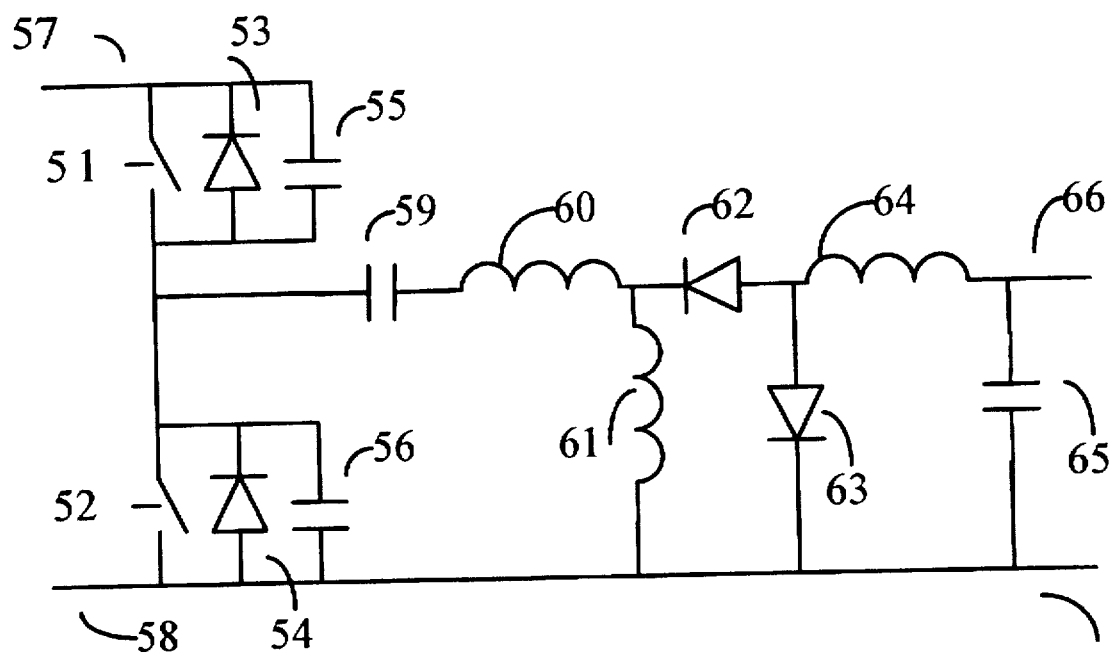
FIG. 9 is the schematic diagram of a power converter of the converter family which provides negative output voltage.

An embodiment modified from the basic embodiment is shown in FIG. 9 which provides an output voltage which is negative with respect to the input voltage. Similar to the basic embodiment, it comprises of switch and diode combinations connected across the input source; capacitor 59, inductor 60 and inductor 61 connected to the switches and the negative input terminal; inductor-capacitor output filter. Diode 62 and diode 63 are connected in a different manner from the basic embodiment. The anode of diode 62 and diode 63 are connected together to the output filter inductor 64. The cathode of diode 62 is connected to the junction connecting inductor 60 and 61. The cathode of diode 63 is connected to the input terminal with lower potential.

The driving signals of switches 51 and 52 are the same as the driving signals for switches 1 and 2 in the basic embodiment. In operation switch 51 and switch 52 turn on and off alternately, and a time gap in which both switches are off is placed between the turning off of one switch and the turning on of the other switch. In this time gap Zero Voltage Switching of the devices are enabled. When switch 51 turns on energy is stored in capacitor 59 and inductors 60 and 61. When switch 52 is turned on, energy is transferred to the output through diode 62. It is assumed that current in output filter inductor 64 is continuous and remains non zero.

Figure 10:
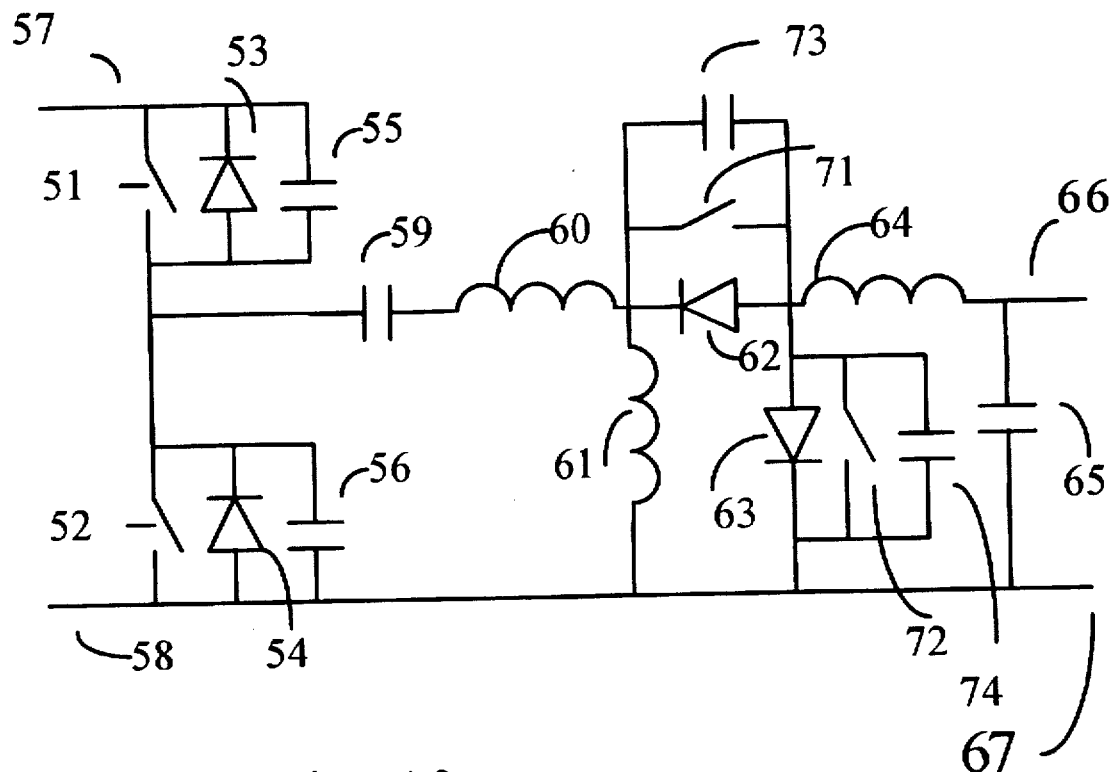
FIG. 10 is the schematic diagram of a power converter of FIG. 9 with synchronized switches.

The embodiment which provides a negative output voltage is modified to provide another embodiment shown in FIG. 10. This embodiment has the same function as the one shown in FIG. 9 but this embodiment incorporates switches across diodes 62 and 63 in order to reduce conduction dissipation. Switch 71 and capacitor 73 are connected across diode 62. Capacitor 73 may be external components or parasitic capacitance of the switch. Switch 71 operates in synchronization with switch 52, i.e. when switch 52 is turned on switch 71 is also turned on and current is diverted to the switch which has lower conduction losses than a diode. Similarly, switch 72 and capacitor 74 are connected across diode 63. Capacitor 74 may be external components or parasitic capacitance of the switch. Switch 72 operates in synchronization with switch 52, i.e. when switch 52 is turned on switch 72 is also turned on and current is diverted to the switch which has lower conduction losses than a diode. This embodiment reduces conduction losses in the output diodes and is suitable for converter designed for low output voltages.

Figure 11:
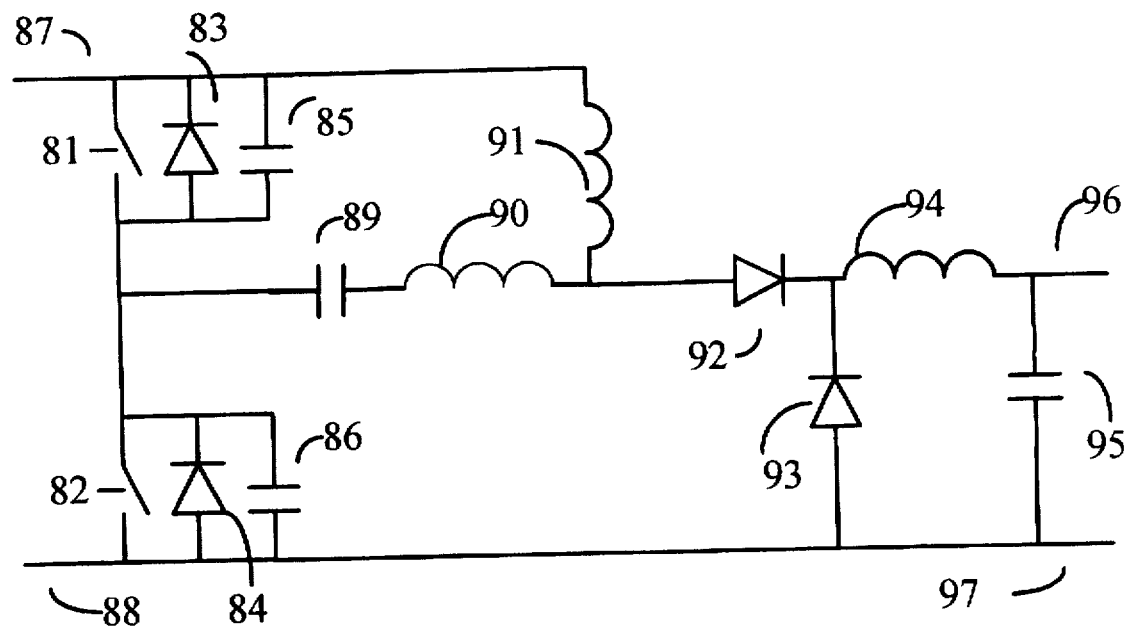
FIG. 11 is the schematic diagram of a boost converter of the converter family.

Another embodiment modified from the basic embodiment is shown in FIG. 11 which provides a stepped up output voltage with respect to the input voltage. Similar to the basic embodiment, it comprises of switch and diode combinations connected across the input source; a capacitor 89 in series with an inductor 90 connected to the node connecting the two switch-diode combination. The main inductor 91 is connected to the positive terminal of the input and the inductor 90. This is the main difference compared with the basic embodiment. This embodiment also comprises diodes 92 and 93 connected with anodes connected to inductor 91 and the input terminal 88 respectively and the cathode connected to the output filter consisting of inductor 94 and capacitor 95.

The driving signals of switches 81 and 82 are the same as the driving signals for switches 1 and 2 in the basic embodiment. In operation switch 81 and switch 82 turn on and off alternately, and a time gap in which both switches are off is placed between the turning off of one switch and the turning on of the other switch. In this time gap Zero Voltage Switching of the devices are enabled.

Figure 12:
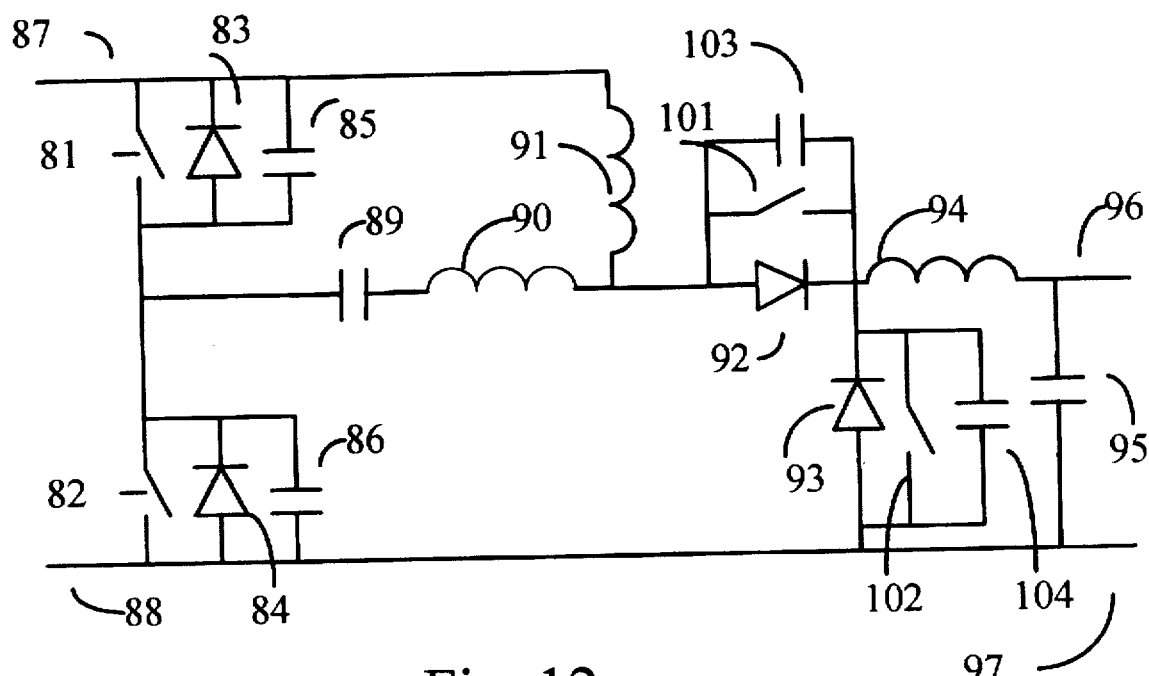
FIG. 12 is the schematic diagram of a power converter of FIG. 11 with synchronized switches.

The embodiment which provides a stepped up output voltage is modified to provide another embodiment shown in FIG. 12. This embodiment has the same function as the step up converter shown in FIG. 11 but this embodiment incorporates switches across diodes 92 and 93 in order to reduce conduction dissipation. Switch 101 and capacitor 103 are connected across diode 92. Capacitor 103 may be external components or parasitic capacitance of the switch. Switch 81 operates in synchronization with switch 92, i.e. when switch 92 is turned on switch 81 is also turned on and current is diverted to the switch which has lower conduction losses than a diode. Similarly, switch 102 and capacitor 104 are connected across diode 93. Capacitor 104 may be external components or parasitic capacitance of the switch. Switch 102 operates in synchronization with switch 82, i.e. when switch 102 is turned on switch 82 is also turned on and current is diverted to the switch which has lower conduction losses than a diode. This embodiment reduces conduction losses in the output diodes.

Figure 13:
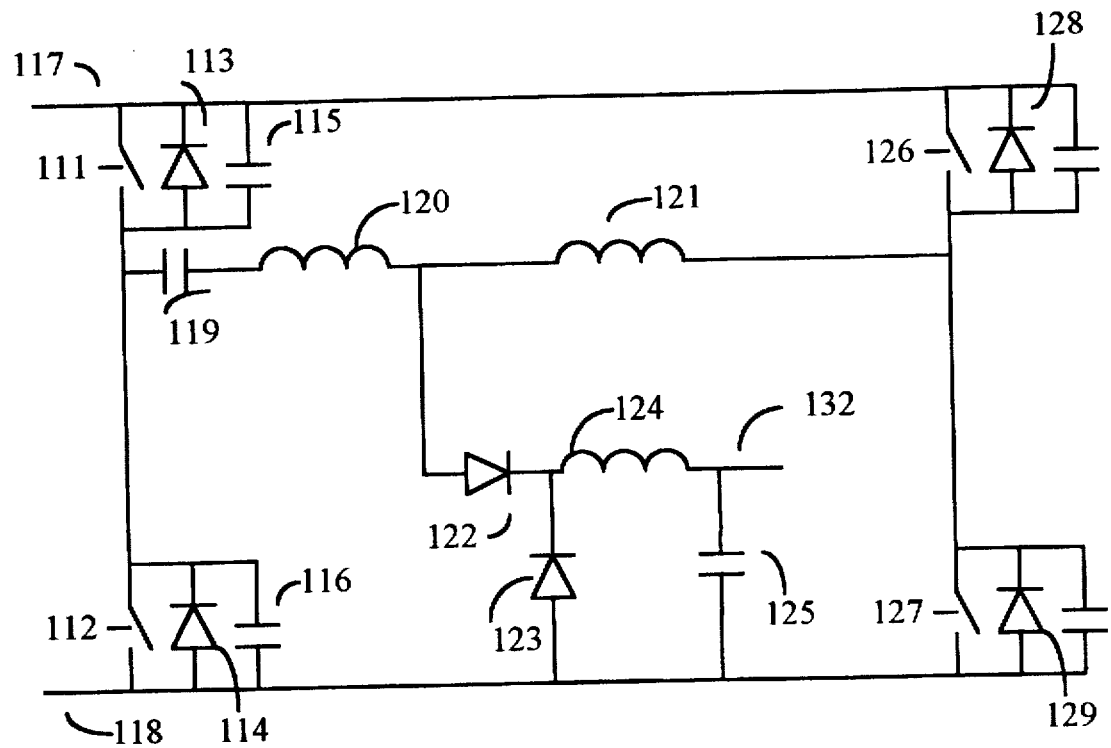
FIG. 13 is the schematic diagram of a full bridge converter of the converter family.

Another embodiment modified from the basic embodiment is shown in FIG. 13 which utilize the full bridge circuit. Being different from the basic embodiment, it comprises of four switch (111,112, 126,127) and diode (113,114, 128,129) combinations connected across the input source. A capacitor 119 in series with an inductor 120 and inductor 121 are connected across the two nodes connecting the two pairs of switch-diode combination. This is the main difference compared with the basic embodiment. This embodiment also comprises diodes 122 and 123 connected with anodes connected to inductor 121 and the input terminal 118 respectively and the cathode connected to the output filter consisting of inductor 124 and capacitor 125.

The output terminal 132 together with terminal 118 are to be connected to a DC load. The bridge embodiment provides better utilization of the input source voltage.

The driving signals of switches 111 and 112 are the same as the driving signals for switches 1 and 2 in the basic embodiment, besides that switch 127 is in synchronization with switch 111 and switch 126 is in synchronization with switch 112. In operation switch pairs 111,127 and switch pairs 112,126 turn on and off alternately, and a time gap in which all the switches are off is placed between the turning off of one switch pair and the turning on of the other switch pair. In this time gap Zero Voltage Switching of the devices are enabled.

Figure 14:
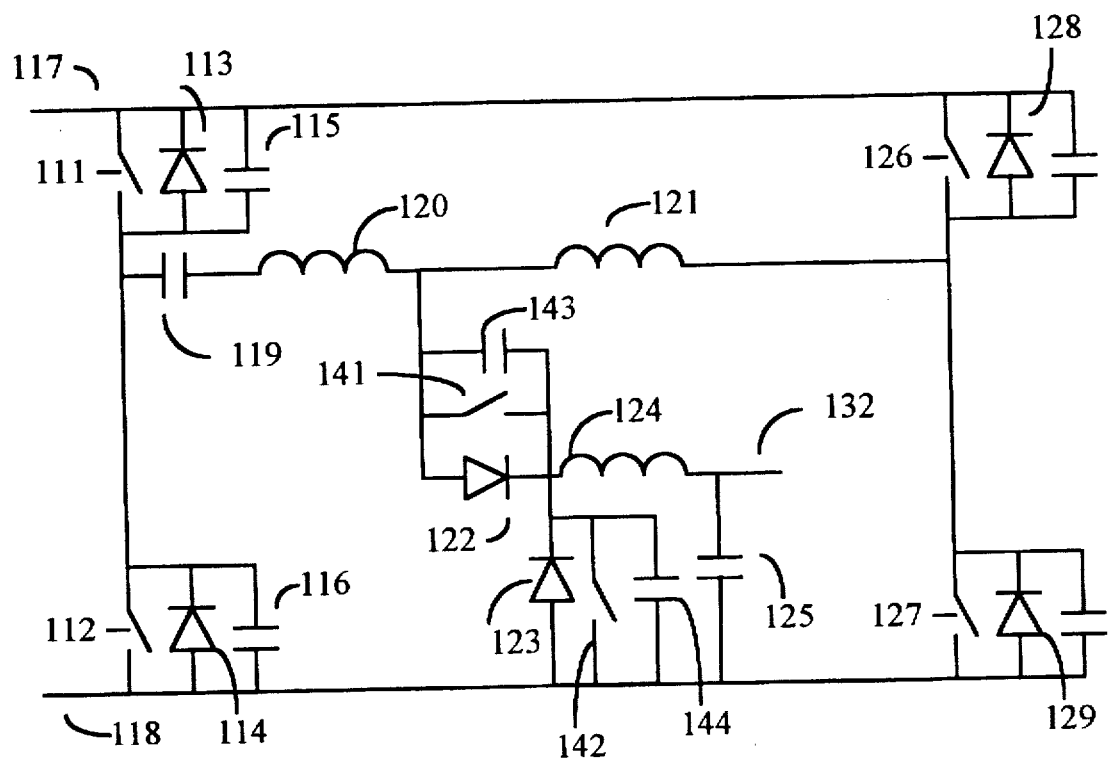
FIG. 14 is the schematic diagram of a power converter of FIG. 13 with synchronized switches.

The full bridge embodiment is modified to provide another embodiment shown in FIG. 14. This embodiment has the same function as the full bridge converter shown in FIG. 13 but this embodiment incorporates switches across diodes 122 and 123 in order to reduce conduction dissipation. Switch 141 and capacitor 143 are connected across diode 122. Capacitor 143 may be external components or parasitic capacitance of the switch. Switch 141 operates in synchronization with switch pair 111 and 127, i.e. when switch pairs 111 and 127 is turned on switch 141 is also turned on and current is diverted to the switch which has lower conduction losses than a diode. Similarly, switch 142 and capacitor 144 are connected across diode 123. Capacitor 144 may be external components or parasitic capacitance of the switch. Switch 142 operates in synchronization with switch pair 112 and 126, i.e. when switch pair 112 and 126 is turned on switch 142 is also turned on and current is diverted to the switch which has lower conduction losses than a diode. This embodiment reduces conduction losses in the output diodes.

Figure 15:
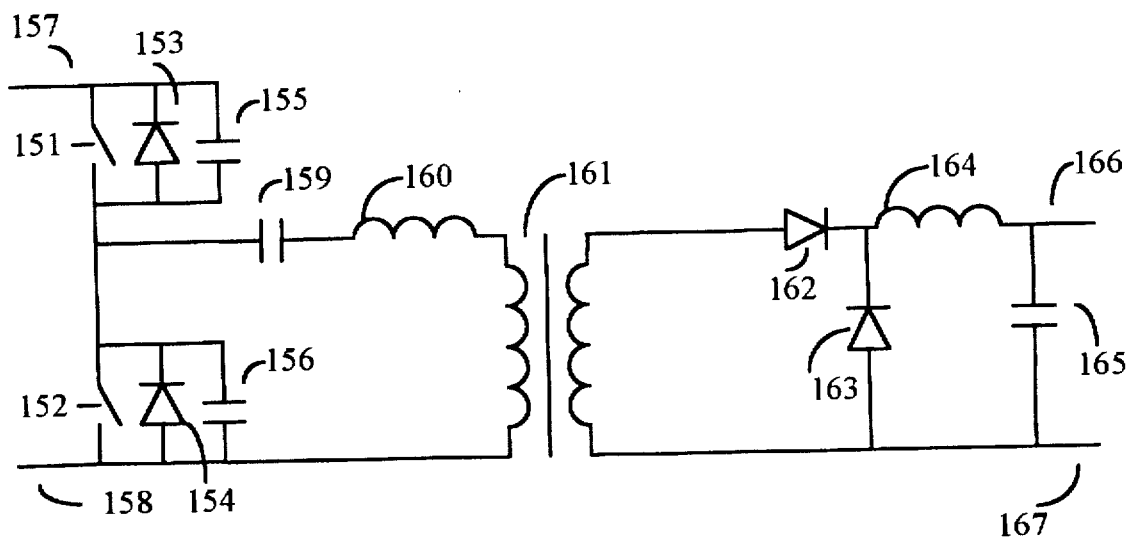
FIG. 15 is the schematic diagram of a transformer isolated converter of the converter family.

Another embodiment modified from the basic embodiment is shown in FIG. 15 which replaces the main inductor by a transformer 161. The transformer provides isolation between the input and output terminals, and also the transformer turns ratio provides either step up or step down power conversion. Similar to the basic embodiment, it comprises of switch and diode combinations connected across the input source; capacitor 159, inductor 160 are connected to the node joining the switches and the primary winding of transformer 161. Diode 162 and diode 163 are connected to the secondary winding of the transformer as shown in FIG. 15. The cathode of diode 162 and diode 163 are connected together to the output filter inductor 164. The anode of diode 162 is connected to one of the transformer secondary terminal and the anode of diode 163 is connected to the other transformer output terminal.

The driving signals of switches 151 and 152 are the same as the driving signals for switches 1 and 2 in the basic embodiment. In operation switch 151 and switch 152 turn on and off alternately, and a time gap in which both switches are off is placed between the turning off of one switch and the turning on of the other switch. In this time gap Zero Voltage Switching of the devices are enabled. When switch 151 is turned on, energy is transferred to the output through diode 162. It is assumed that current in output filter inductor 164 is continuous and remains non zero.

Figure 16:
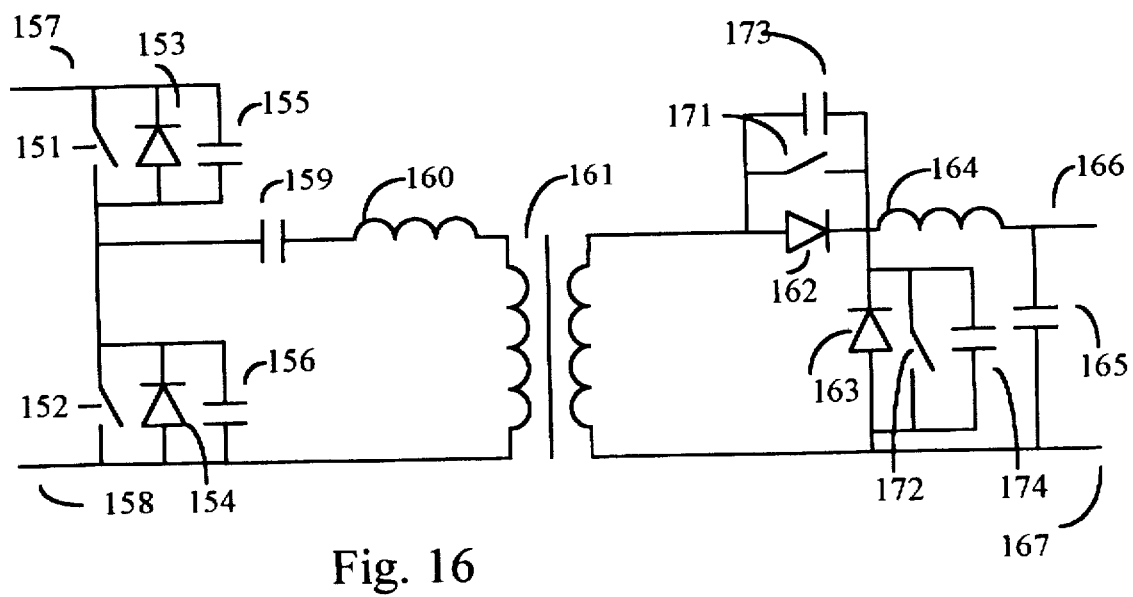
FIG. 16 is the schematic diagram of a power converter of FIG. 15 with synchronized switches.

The embodiment which provides transformer isolation is modified to provide another embodiment shown in FIG. 16. This embodiment has the same function as the one shown in FIG. 15 but this embodiment incorporates switches across diodes 162 and 163 in order to reduce conduction dissipation. Switch 171 and capacitor 173 are connected across diode 162. Capacitor 173 may be external components or parasitic capacitance of the switch. Switch 171 operates in synchronization with switch 151 or 152, when switch 171 is also turned on current is diverted to the switch which has lower conduction losses than a diode. Similarly, switch 172 and capacitor 174 are connected across diode 163. Capacitor 174 may be external components or parasitic capacitance of the switch. Switch 172 operates in synchronization with switch 152 or 151, when switch 172 is also turned on and current is diverted to the switch which has lower conduction losses than a diode. This embodiment reduces conduction losses in the output diodes and is suitable for converter designed for low output voltages.

Figure 17:
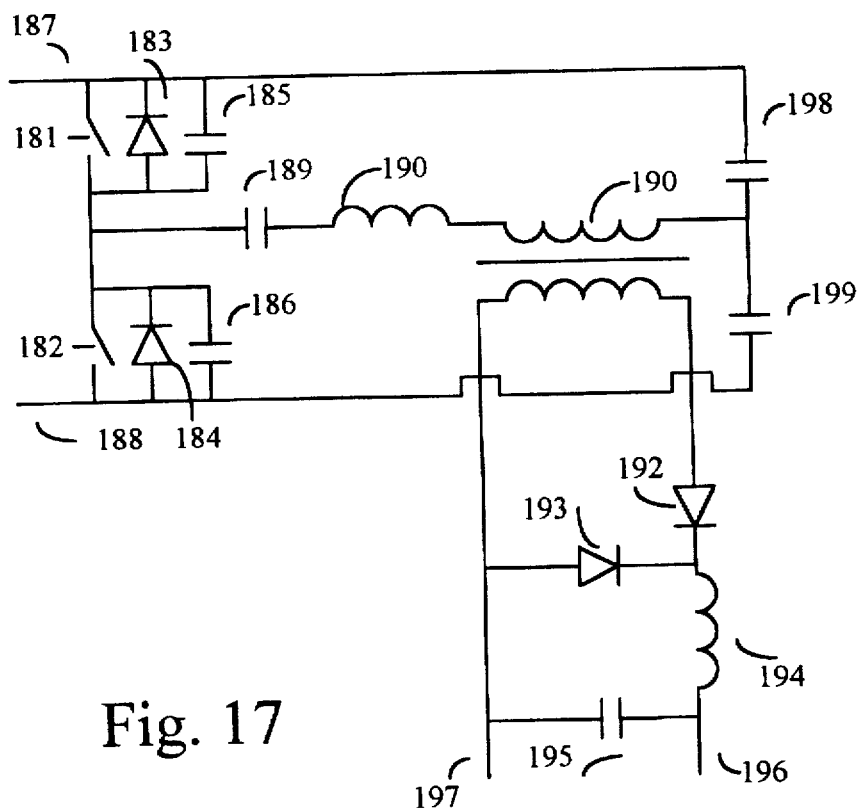
FIG. 17 is the schematic diagram of a half bridge transformer isolated converter of the converter family.

Another embodiment modified from the transformer isolated embodiment discussed in the previous section is shown in FIG. 17 which utilize the half bridge embodiment. Similar to the transformer isolated embodiment, it comprises of switch and diode combinations connected across the input source; capacitor 189, inductor 190 are connected to the node joining the switches and the primary winding of transformer 191. Two additional capacitors 198 and 199 are connected in series and connected across the input source at terminals 181 and 182. One end of the transformer primary winding is connected to the node joining capacitors 198 and 199. Diode 192 and diode 193 are connected to the secondary winding of the transformer as shown in FIG. 17. The cathode of diode 192 and diode 193 are connected together to the output filter inductor 194.

The driving signals of switches 181 and 182 are the same as the driving signals for switches 1 and 2 in the basic embodiment. In operation switch 181 and switch 182 turn on and off alternately, and a time gap in which both switches are off is placed between the turning off of one switch and the turning on of the other switch. In this time gap Zero Voltage Switching of the devices are enabled. When switch 181 turns on energy is transferred to the output through diode 192. When switch 182 turns on, current in the filter inductor 194 circulates through the diode 195. It is assumed that current in output filter inductor 164 is continuous and remains non zero.

Figure 18:
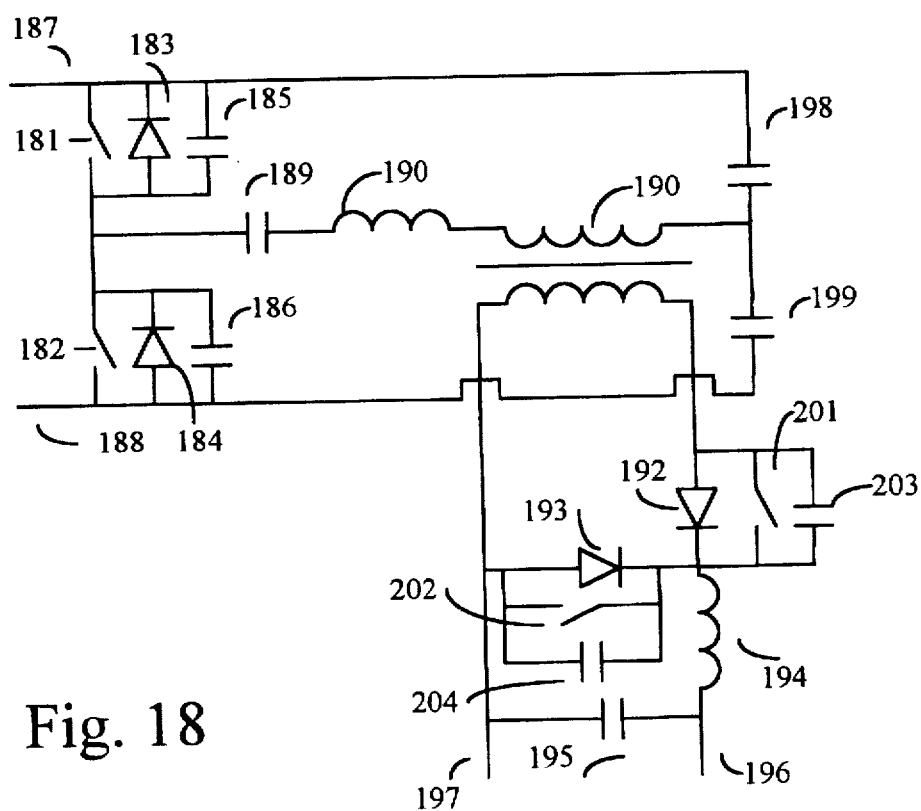
FIG. 18 is the schematic diagram of a power converter of FIG. 17 with synchronized switches.

The embodiment which provides transformer isolation in a half bridge configuration discussed in last section is modified to provide another embodiment shown in FIG. 18. This embodiment has the same function as the one shown in FIG. 17 but this embodiment incorporates switches across diodes 192 and 193 in order to reduce conduction dissipation. Switch 201 and capacitor 203 are connected across diode 192. Capacitor 203 may be external components or parasitic capacitance of the switch. Switch 201 operates in synchronization with switch 181 or switch 182, when switch 201 is turned on and current is diverted to the switch which has lower conduction losses than a diode. Similarly, switch 202 and capacitor 204 are connected across diode 193. Capacitor 204 may be external components or parasitic capacitance of the switch. Switch 202 operates in synchronization with switch 182 or switch 181, when switch 202 is turned on and current is diverted to the switch which has lower conduction losses than a diode. This embodiment reduces conduction losses in the output diodes and is suitable for converter designed for low output voltages.

Figure 19:
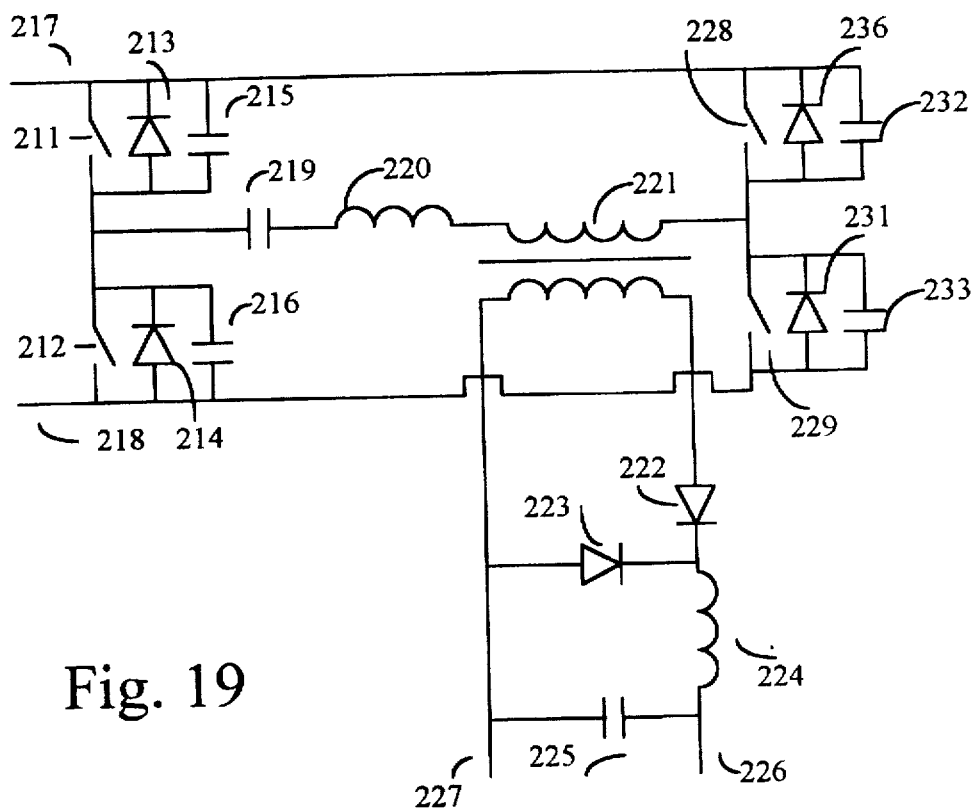
FIG. 19 is the schematic diagram of a full bridge transformer isolated converter of the converter family.

Another embodiment modified from the transformer isolated half bridge embodiment discussed in the previous section is shown in FIG. 19 which utilize the full bridge embodiment. Similar to the transformer isolated embodiment, it comprises of switch and diode combinations connected across the input source; capacitor 219, inductor 220 are connected to the node joining the switches and the primary winding of transformer 221. Two additional switch (228,229) and diode (230,231) combinations are connected in series and connected across the input source at terminals 181 and 182. Capacitances 232 and 233 are either external capacitances or parasitic capacitances of the switches. One end of the transformer primary winding is connected to the node joining switches 228 and 229. Diode 222 and diode 223 are connected to the secondary winding of the transformer as shown in FIG. 19. The cathode of diode 222 and diode 223 are connected together to the output filter inductor 224.

The driving signals of switches 211 and 212 are the same as the driving signals for switches 1 and 2 in the basic embodiment, besides that switch 229 is in synchronization with switch 211 and switch 228 is in synchronization with switch 212. In operation switch pairs 211,229 and switch pairs 212,228 turn on and off alternately, and a time gap in which all the switches are off is placed between the turning off of one switch pair and the turning on of the other switch pair. In this time gap Zero Voltage Switching of the devices are enabled.

Figure 20:
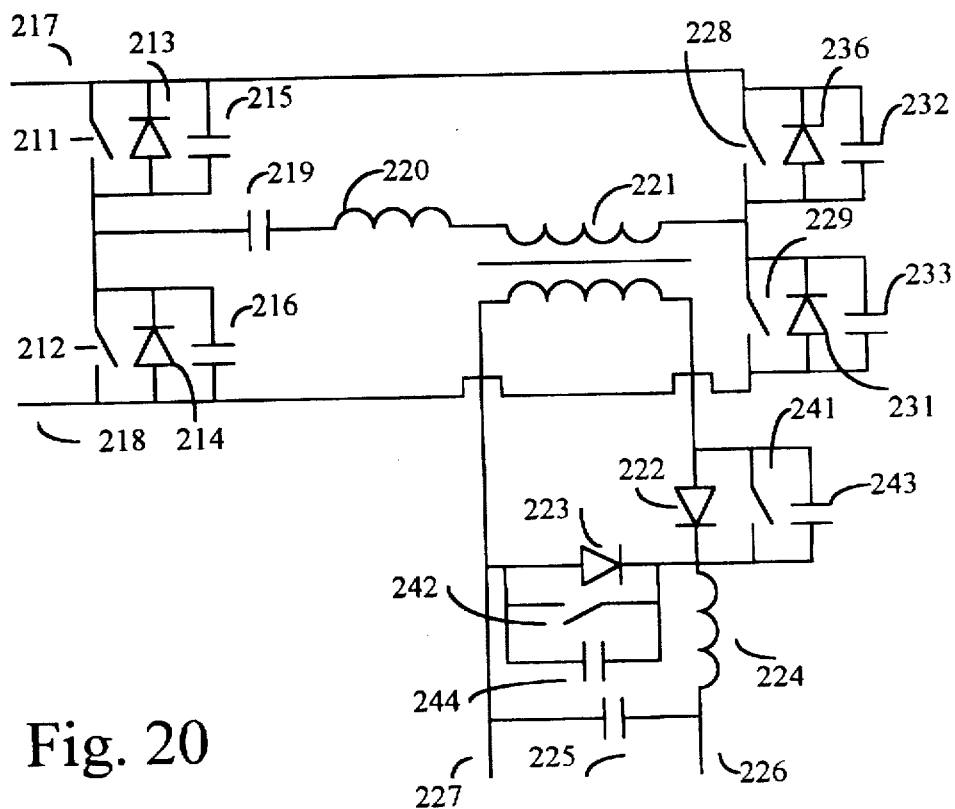
FIG. 20 is the schematic diagram of a power converter of FIG. 19 with synchronized switches.

The embodiment which provides transformer isolation in a full bridge configuration discussed in last section is modified to provide another embodiment shown in FIG. 20. This embodiment has the same function as the one shown in FIG. 19 but this embodiment incorporates switches across diodes 222 and 223 in order to reduce conduction dissipation. Switch 241 and capacitor 243 are connected across diode 222. Capacitor 243 may be external components or parasitic capacitance of the switch. Switch 241 operates in synchronization with switch pair 211 and 229, or switch pair 212 and 228, when switch 241 is also turned on and current is diverted to the switch which has lower conduction losses than a diode. Similarly, switch 242 and capacitor 244 are connected across diode 223. Capacitor 244 may be external components or parasitic capacitance of the switch. Switch 242 operates in synchronization with switch pair 212 and 228, i.e. when switch pair 212 and 228 is turned on switch 242 is also turned on and current is diverted to the switch which has lower conduction losses than a diode. This embodiment reduces conduction losses in the output diodes and is suitable for converter designed for low output voltages.

What is claimed is:

1. A power converter comprising:

a first input terminal and a second input terminal for connection to a DC source;

a first output terminal and a second output terminal for connection to a DC load;

a first and a second switch means each having at least a first and a second switch terminal, the first switch and the second switch being connected in series and coupled to the first and second input terminals;

a first diode connected in parallel with the first switch, with its cathode connected to the input terminal with higher potential;

a second diode connected in parallel with the second switch, with its anode connected to the input terminal with lower potential, the first and second diode may be combined part of the first and second switch respectively;

a first capacitor connected in parallel with the first diode;

a second capacitor connected in parallel with the second diode, the first and second capacitor may be combined part of the first and second switch respectively;

a first inductor is connected in series with a third capacitor, which is coupled to the node joining the first switch and the second switch;

means by which the first and second switches periodically and alternately closing, the first switch close for a first time period and the second switch close for a second time period, a third time period in which the two switches are open separates the end of the first time period and the beginning of the second time period, only one or none of the switches being closed at any given time, while a fourth time period separates the end of the second time period and the beginning of the first period, the third time period and the fourth time period being equal in magnitude;

means by which the first and second switches close when the voltage across the switch is substantially zero;

a second inductor with one of its two terminals connected to the series combination of the first inductor and the third capacitor, and the other terminal connected to the input terminal with lower potential;

a third diode with its cathode connected to the cathode of a fourth diode, and the anode of the third diode is connected to the node joining the second inductor and the series combination of the first inductor and the third capacitor;

said fourth diode with its cathode connected to the cathode of the third diode, and the anode of the fourth diode is connected to the node joining the input terminal with lower potential;

a third inductor which connects the node joining the cathodes of the third and the fourth diode to the output terminal with higher potential;

a fourth capacitor connected to the output terminals;

a connection connecting the output terminal with lower potential and the input terminal with lower potential.

2. A power converter as set forth in claim 1 comprising:

a third switch and a fourth switch each having at least two switch terminals, the third switch is connected in parallel with the third diode and the fourth switch connected in parallel with the fourth diode;

a fifth capacitor and a sixth capacitor where the fifth capacitor is connected across the third switch and the sixth capacitor is connected across the fourth switch, theses capacitance are the lump parasitic capacitance of the associated switches and diodes;

control means for selectively activating the third switch and the fourth switch, such that the third switch operates in synchronization with the first switch, and the fourth switch operates in synchronization with the second switch.

3. A power converter comprising:

a first input terminal and a second input terminal for connection to a DC source;

a first output terminal and a second output terminal for connection to a DC load;

a first and a second switch means each having at least a first and a second switch terminal, the first switch and the second switch being connected in series and coupled to the first and second input terminals;

a first diode connected in parallel with the first switch, with its cathode connected to the input terminal with higher potential;

a second diode connected in parallel with the second switch, with its anode connected to the input terminal with lower potential, the first and second diode may be combined part of the first and second switch respectively;

a first capacitor connected in parallel with the first diode;

a second capacitor connected in parallel with the second diode, the first and second capacitor may be combined part of the first and second switch respectively;

a first inductor is connected in series with a third capacitor, which is coupled to the node joining the first switch and the second switch;

means by which the first and second switches periodically and alternately closing, the first switch close for a first time period and the second switch close for a second time period, a third time period in which the two switches are open separates the end of the first time period and the beginning of the second time period, only one or none of the switches being closed at any given time, while a fourth time period separates the end of the second time period and the beginning of the first period, the third time period and the fourth time period being equal in magnitude;

means by which the first and second switches close when the voltage across the switch is substantially zero;

a second inductor with one of its two terminals connected to the series combination of the first inductor and the third capacitor, and the other terminal connected to the input terminal with lower potential;

a third diode with its anode connected to the anode of a fourth diode, and the cathode of the third diode is connected to the node joining the second inductor and the series combination of the first inductor and the third capacitor;

said fourth diode with its anode connected to the anode of the third diode, and the cathode of the fourth diode is connected to the node joining the input terminal with lower potential;

a third inductor connected to the node joining the anodes of the third and the fourth diode and the output terminal with higher potential;

a fourth capacitor connected to the output terminals;

a connection connecting the output terminal with lower potential and the input terminal with lower potential.

4. A power converter as set forth in claim 3 comprising:

a third switch and a fourth switch each having at least two switch terminals, the third switch is connected in parallel with the third diode and the fourth switch connected in parallel with the fourth diode;

a fifth capacitor and a sixth capacitor where the fifth capacitor is connected across the third switch and the sixth capacitor is connected across the fourth switch, theses capacitance are the lump parasitic capacitance of the associated switches and diodes, control means for selectively activating the third switch and the fourth switch, such that the third switch operates in synchronization with the second switch, and the fourth switch operates in synchronization with the first switch.

5. A power converter comprising:

a first input terminal and a second input terminal for connection to a DC source;

a first output terminal and a second output terminal for connection to a DC load;

a first and a second switch means each having at least a first and a second switch terminal, the first switch and the second switch being connected in series and coupled to the first and second input terminals;

a first diode connected in parallel with the first switch, with its cathode connected to the input terminal with higher potential;

a second diode connected in parallel with the second switch, with its anode connected to the input terminal with lower potential, the first and second diode may be combined part of the first and second switch respectively;

a first capacitor connected in parallel with the first diode;

a second capacitor connected in parallel with the second diode, the first and second capacitor may be combined part of the first and second switch respectively;

a first inductor is connected in series with a third capacitor, which is coupled to the node joining the first switch and the second switch;

means by which the first and second switches periodically and alternately closing, the first switch close for a first time period and the second switch close for a second time period, a third time period in which the two switches are open separates the end of the first time period and the beginning of the second time period, only one or none of the switches being closed at any given time, while a fourth time period separates the end of the second time period and the beginning of the first period, the third time period and the fourth time period being equal in magnitude;

means by which the first and second switches close when the voltage across the switch is substantially zero;

a second inductor with one of its two terminals connected to the series combination of the first inductor and the third capacitor, and the other terminal connected the input terminal with higher potential;

a third diode with its cathode connected to the cathode of a fourth diode, and the anode of the third diode is connected to the node joining the second inductor and the series combination of the first inductor and the third capacitor;

said fourth diode with its cathode connected to the cathode of the third diode, and the anode of the fourth diode is connected to the node joining the input terminal with lower potential;

a third inductor connected to the node joining the cathodes of the third and the fourth diode and the output terminal with higher potential;

a fourth capacitor connected to the output terminals;

a connection connecting the output terminal with lower potential and the input terminal with lower potential.

6. A power converter as set forth in claim 5 comprising:

a third switch and a fourth switch each having at least two switch terminals, the third switch is connected in parallel with the third diode and the fourth switch connected in parallel with the fourth diode;

a fifth capacitor and a sixth capacitor where the fifth capacitor is connected across the third switch and the sixth capacitor is connected across the fourth switch, theses capacitance are the lump parasitic capacitance of the associated switches and diodes;

control means for selectively activating the third switch and the fourth switch, such that the third switch operates in synchronization with the first switch, and the fourth switch operates in synchronization with the second switch.

7. A power converter comprising:

a first input terminal and a second input terminal for connection to a DC source;

a first output terminal and a second output terminal for connection to a DC load;

a first and a second switch means each having at least a first and a second switch terminal, the first switch and the second switch being connected in series and coupled to the first and second input terminals;

a first diode connected in parallel with the first switch, with its cathode connected to the input terminal with higher potential;

a second diode connected in parallel with the second switch, with its anode connected to the input terminal with lower potential, the first and second diode may be combined part of the first and second switch respectively;

a first capacitor connected in parallel with the first diode;

a second capacitor connected in parallel with the second diode, the first and second capacitor may be combined part of the first and second switch respectively;

a first inductor is connected in series with a third capacitor, which is coupled to the node joining the first switch and the second switch;

means by which the first and second switches periodically and alternately closing, the first switch close for a first time period and the second switch close for a second time period, a third time period in which the two switches are open separates the end of the first time period and the beginning of the second time period, only one or none of the switches being closed at any given time, while a fourth time period separates the end of the second time period and the beginning of the first period, the third time period and the fourth time period being equal in magnitude;

means by which the first and second switches close when the voltage across the switch is substantially zero;

a third and a fourth switch means each having at least a first and a second switch terminal, the first switch and the second switch being connected in series and coupled to the first and second input terminals;

a third diode connected in parallel with the third switch, with its cathode connected to the input terminal with higher potential, a fourth diode connected in parallel with the fourth switch, with its anode connected to the input terminal with lower potential, a third capacitor connected in parallel with the third diode;

a fourth capacitor connected in parallel with the fourth diode;

a second inductor with one of its two terminals connected to the series combination of the first inductor and the third capacitor, and the other terminal of the second inductor is connected to the node joining the third and the fourth switch;

a fifth diode with its cathode connected to the cathode of a sixth diode, and the anode of the fifth diode is connected to the node joining the second inductor and the series combination of the first inductor and the third capacitor;

a sixth diode with its cathode connected to the cathode of a fifth diode, and the anode of the sixth diode is connected to the node joining the input terminal with lower potential;

a third inductor connected to the node joining the cathodes of the fifth and the sixth diode and the output terminal with higher potential;

a fourth capacitor connected to the output terminals;

a connection connecting the output terminal with lower potential and the input terminal with lower potential;

control means for the third and the fourth switches such that the third switch operates in synchronization with the second switch and the fourth switch operates in synchronization with the first switch.

8. A power converter as set forth in claim 7 comprising:

a fifth switch and a sixth switch each having at least two switch terminals, the fifth switch is connected in parallel with the fifth diode and the sixth switch connected in parallel with the sixth diode;

a seventh capacitor and an eighth capacitor where the seventh capacitor is connected across the fifth switch and the eighth capacitor is connected across the sixth switch, theses capacitance are the lump parasitic capacitance of the associated switches and diodes;

control means for selectively activating the fifth switch and the sixth switch, such that the fifth switch operates in synchronization with the first and fourth switch pair, and the sixth switch operates in synchronization with the second and third switch pair.

9. A power converter comprising:

a first input terminal and a second input terminal for connection to a DC source;

a first output terminal and a second output terminal for connection to a DC load;

a first and a second switch means each having at least a first and a second switch terminal, the first switch and the second switch being connected in series and coupled to the first and second input terminals;

a first diode connected in parallel with the first switch, with its cathode connected to the input terminal with higher potential;

a second diode connected in parallel with the second switch, with its anode connected to the input terminal with lower potential, the first and second diode may be combined part of the first and second switch respectively;

a first capacitor connected in parallel with the first diode;

a second capacitor connected in parallel with the second diode, the first and second capacitor may be combined part of the first and second switch respectively;

a first inductor is connected in series with a third capacitor, which is coupled to the node joining the first switch and the second switch;

means by which the first and second switches periodically and alternately closing, the first switch close for a first time period and the second switch close for a second time period, a third time period in which the two switches are open separates the end of the first time period and the beginning of the second time period, only one or none of the switches being closed at any given time, while a fourth time period separates the end of the second time period and the beginning of the first period, the third time period and the fourth time period being equal in magnitude;

means by which the first and second switches close when the voltage across the switch is substantially zero;

a first transformer having a primary winding and a secondary winding, one of the primary winding terminals are connected to the series inductor capacitor combination and the other primary terminal connected to the input terminal with lower potential.

a third diode with its cathode connected to the cathode of a fourth diode, and the anode of the third diode is connected to the secondary winding;

a fourth diode with its anode connected to the secondary winding and the output terminal with lower potential;

a second inductor connected to the node joining the cathodes of the third and the fourth diode and the output terminal with higher potential;

a fourth capacitor connected to the output terminals;

a connection connecting the output terminal with lower potential to the secondary winding.

10. A power converter as set forth in claim 9 comprising:

a third switch and a fourth switch each having at least two switch terminals, the third switch is connected in parallel with the third diode and the fourth switch connected in parallel with the fourth diode;

a fifth capacitor and a sixth capacitor where the fifth capacitor is connected across the third switch and the sixth capacitor is connected across the fourth switch, theses capacitance are the lump parasitic capacitance of the associated switches and diodes;

control means for selectively activating the third switch and the fourth switch, such that the third switch operates in synchronization with the first switch, and the fourth switch operates in synchronization with the second switch.

11. A power converter comprising:

a first input terminal and a second input terminal for connection to a DC source;

a first output terminal and a second output terminal for connection to a DC load;

a first and a second switch means each having at least a first and a second switch terminal, the first switch and the second switch being connected in series and coupled to the first and second input terminals;

a first diode connected in parallel with the first switch, with its cathode connected to the input terminal with higher potential;

a second diode connected in parallel with the second switch, with its anode connected to the input terminal with lower potential, the first and second diode may be combined part of the first and second switch respectively;

a first capacitor connected in parallel with the first diode;

a second capacitor connected in parallel with the second diode, the first and second capacitor may be combined part of the first and second switch respectively;

a first inductor is connected in series with a third capacitor, which is coupled to the node joining the first switch and the second switch;

means by which the first and second switches periodically and alternately closing, the first switch close for a first time period and the second switch close for a second time period, a third time period in which the two switches are open separates the end of the first time period and the beginning of the second time period, only one or none of the switches being closed at any given time, while a fourth time period separates the end of the second time period and the beginning of the first period, the third time period and the fourth time period being equal in magnitude;

means by which the first and second switches close when the voltage across the switch is substantially zero;

a first transformer having a primary winding and a secondary winding, one of the primary winding terminals are connected to the series inductor capacitor combination, a third diode with its cathode connected to the cathode of a fourth diode, and the anode of the third diode is connected to the secondary winding;

a fourth diode with its anode connected to the secondary winding and the output terminal with lower potential;

a second inductor connected to the node joining the cathodes of the third and the fourth diode and the output terminal with higher potential;

a fourth capacitor connected to the output terminals;

a connection connecting the output terminal with lower potential to the secondary winding;

a fifth and a sixth capacitor connected in series which are coupled to the input terminals, the node joining the two said capacitors is connected to one of the terminals of the primary winding of the first transformer.

12. A power converter as set forth in claim 11 comprising:

a third switch and a fourth switch each having at least two switch terminals, the third switch is connected in parallel with the third diode and the fourth switch connected in parallel with the fourth diode;

a fifth capacitor and a sixth capacitor where the fifth capacitor is connected across the third switch and the sixth capacitor is connected across the fourth switch, theses capacitance are the lump parasitic capacitance of the associated switches and diodes;

control means for selectively activating the third switch and the fourth switch, such that the third switch operates in synchronization with the first switch, and the fourth switch operates in synchronization with the second switch.

13. A power converter comprising:

a first input terminal and a second input terminal for connection to a DC source;

a first output terminal and a second output terminal for connection to a DC load;

a first and a second switch means each having at least a first and a second switch terminal, the first switch and the second switch being connected in series and coupled to the first and second input terminals;

a first diode connected in parallel with the first switch, with its cathode connected to the input terminal with higher potential;

a second diode connected in parallel with the second switch, with its anode connected to the input terminal with lower potential, the first and second diode may be combined part of the first and second switch respectively;

a first capacitor connected in parallel with the first diode;

a second capacitor connected in parallel with the second diode, the first and second capacitor may be combined part of the first and second switch respectively;

a first inductor is connected in series with a third capacitor, which is coupled to the node joining the first switch and the second switch;

means by which the first and second switches periodically and alternately closing, the first switch close for a first time period and the second switch close for a second time period, a third time period in which the two switches are open separates the end of the first time period and the beginning of the second time period, only one or none of the switches being closed at any given time, while a fourth time period separates the end of the second time period and the beginning of the first period, the third time period and the fourth time period being equal in magnitude;

means by which the first and second switches close when the voltage across the switch is substantially zero;

a third and a fourth switch means each having at least a first and a second switch terminal, the first switch and the second switch being connected in series and coupled to the first and second input terminals;

a third diode connected in parallel with the third switch, with its cathode connected to the input terminal with higher potential, a fourth diode connected in parallel with the fourth switch, with its anode connected to the input terminal with lower potential, a third capacitor connected in parallel with the third diode;

a fourth capacitor connected in parallel with the fourth diode;

a first transformer having a primary winding and a secondary winding, one of the primary winding terminals are connected to the series inductor capacitor combination, the other terminal is connected to the node joining the third and the fourth switch;

a fifth diode with its cathode connected to the cathode of a sixth diode, and the anode of the fifth diode is connected to one of the terminals of the secondary winding of the transformer;

a sixth diode with its cathode connected to the cathode of a fifth diode, and the anode of the sixth diode is connected to one of the terminals of the secondary winding of the transformer;

a third inductor connected to the node joining the cathodes of the fifth and the sixth diode and the output terminal with higher potential;

a fourth capacitor connected to the output terminals;

a connection connecting the output terminal with one of the terminals of the secondary winding;

control means for the third and the fourth switches such that the third switch operates in synchronization with the second switch and the fourth switch operates in synchronization with the first switch.

14. A power converter as set forth in claim 13 comprising:

a fifth switch and a sixth switch each having at least two switch terminals, the fifth switch is connected in parallel with the fifth diode and the sixth switch connected in parallel with the sixth diode;

a seventh capacitor and an eighth capacitor where the seventh capacitor is connected across the fifth switch and the eighth capacitor is connected across the sixth switch, theses capacitance are the lump parasitic capacitance of the associated switches and diodes;

control means for selectively activating the fifth switch and the sixth switch, such that the fifth switch operates in synchronization with the first and fourth switch pair, and the sixth switch operates in synchronization with the second and third switch pair.

* * * * *